United States Patent
Li et al.

(10) Patent No.: US 9,813,351 B2
(45) Date of Patent: Nov. 7, 2017

(54) METHOD AND APPARATUS FOR ADAPTIVE PACKET AGGREGATION

(71) Applicants: Xu Li, Nepean (CA); Hang Zhang, Nepean (CA)

(72) Inventors: Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 14/876,128

(22) Filed: Oct. 6, 2015

(65) Prior Publication Data

US 2017/0099231 A1    Apr. 6, 2017

(51) Int. Cl.
*H04L 12/26*     (2006.01)
*H04L 12/891*     (2013.01)
(Continued)

(52) U.S. Cl.
CPC .......... *H04L 47/41* (2013.01); *H04L 41/0896* (2013.01); *H04L 43/0817* (2013.01);
(Continued)

(58) Field of Classification Search
CPC ......... H04L 63/20; H04L 67/42; H04L 63/08; H04L 63/10; H04L 63/0428; H04L 12/4633; H04L 41/0806; H04L 63/04; H04L 41/12; H04L 47/22; H04L 47/2408; H04L 47/2483; H04L 47/41; H04W 28/08; H04W 84/12
See application file for complete search history.

(56) References Cited

U.S. PATENT DOCUMENTS 8,331,230 B2 * 12/2012 Pedersen ............. H04L 47/2416 370/230
8,553,582 B1 * 10/2013 Mizrahi .................. H04L 49/20 370/254
(Continued)

FOREIGN PATENT DOCUMENTS

| CN | 101212819 A | 7/2008 |
|---|---|---|
| CN | 104301066 A | 1/2015 |
| EP | 2117139 A1 | 11/2009 |

OTHER PUBLICATIONS

International Search Report dated Nov. 28, 2016 for International Patent Application No. PCT/CN2016/100417 filed on Sep. 27, 2016.
(Continued)

*Primary Examiner* — Michael J Moore, Jr.

(57) ABSTRACT

A method and apparatus for handling data packets transmitted via a communication tunnel are provided. Tunnel parameters corresponding to transmission of data packets via the communication tunnel are monitored, and aggregation parameters are adjusted based on the tunnel parameters. Based on the current aggregation parameters, the data packets can be aggregated into aggregate data packets for transmission via the communication tunnel. The aggregation parameters can be an aggregation window size. The tunnel parameters can be: end-to-end packet delay of the communication tunnel; throughput of the communication tunnel; and status of one or more queues, such as queue size, belonging to routers of the communication tunnel.

23 Claims, 9 Drawing Sheets

(51) Int. Cl.
*H04L 12/24* (2006.01)
*H04L 12/875* (2013.01)
*H04L 12/835* (2013.01)

(52) U.S. Cl.
CPC ...... *H04L 43/0852* (2013.01); *H04L 43/0888* (2013.01); *H04L 47/30* (2013.01); *H04L 47/56* (2013.01)

(56) References Cited

U.S. PATENT DOCUMENTS

| | | | | |
|---|---|---|---|---|
| 8,737,221 | B1* | 5/2014 | Jilani | H04L 47/2416 370/235 |
| 2004/0170125 | A1* | 9/2004 | O'Neill | H04L 12/185 370/230 |
| 2004/0170156 | A1* | 9/2004 | O'Neill | H04L 12/66 370/349 |
| 2004/0174865 | A1* | 9/2004 | O'Neill | H04L 12/185 370/352 |
| 2008/0080437 | A1 | 4/2008 | Krishnaswamy et al. | |
| 2009/0201898 | A1* | 8/2009 | Gong | H04L 1/0007 370/338 |
| 2011/0019557 | A1* | 1/2011 | Hassan | H04W 28/0215 370/252 |
| 2012/0324100 | A1* | 12/2012 | Tomici | H04L 45/123 709/224 |
| 2014/0161135 | A1* | 6/2014 | Acharya | H04L 47/263 370/412 |
| 2014/0379985 | A1* | 12/2014 | Barber | G06F 12/0811 711/122 |
| 2015/0117464 | A1* | 4/2015 | Miyamoto | H04L 67/2833 370/429 |
| 2015/0222562 | A1* | 8/2015 | Ashokan | H04L 47/27 370/412 |
| 2016/0112896 | A1* | 4/2016 | Karampatsis | H04W 28/0252 370/230.1 |

OTHER PUBLICATIONS

English Abstract of CN104301066.
Shah et al., "Optimal queue-size scaling in switched networks," Annals of Applied Probability, vol. 24, No. 6, pp. 2207-2245, 2014.
ETSI GS NFV-SWA 001.

* cited by examiner

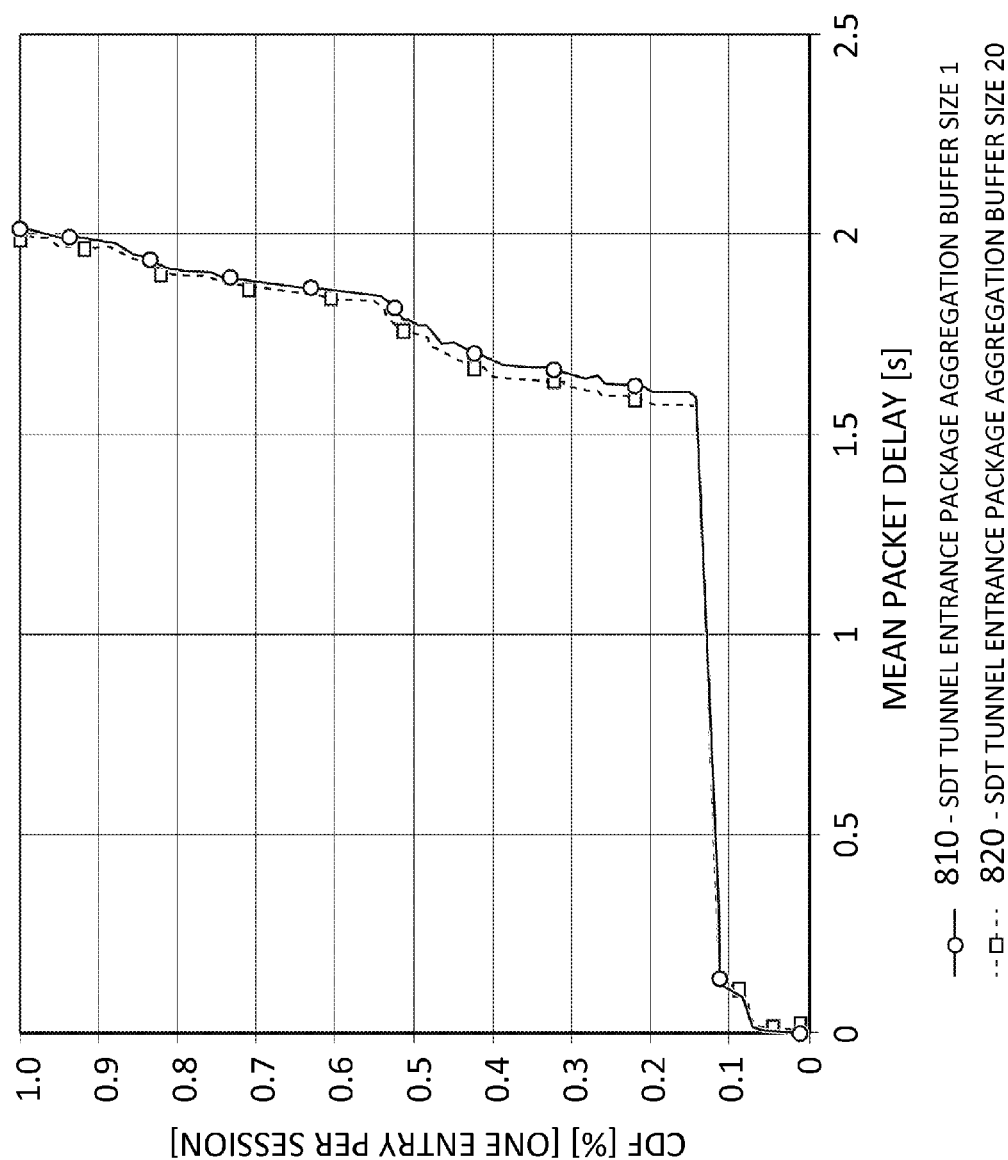

METHOD AND APPARATUS FOR ADAPTIVE PACKET AGGREGATION

CROSS-REFERENCE TO RELATED APPLICATIONS

This is the first application filed for the present invention.

FIELD OF THE INVENTION

The present invention pertains to the field of packet-based communications and in particular to a method and apparatus for adaptive packet aggregation, for example in conjunction with packet tunnelling.

BACKGROUND

Communication tunnels are used in various packet-based communication networks. Tunnels can be viewed as logical connections between pairs of nodes in the network, serving a specified set of traffic flows. As a separate matter, packet aggregation, applied to a network connection, can be used to combine multiple packets together, thereby reducing communication overhead as fewer packets are handled.

However, while particular packet aggregation policies may prove beneficial in some respects, they may also exhibit limitations. Such limitations may be more pronounced under certain network conditions. Hence there is room for improvement in packet aggregation techniques.

Therefore there is a need for a method and apparatus for adaptive packet aggregation, that mitigates or obviates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for adaptive packet aggregation, for example in conjunction with packet tunnelling. In accordance with embodiments of the present invention, there is provided a method for handling data packets transmitted via a communication tunnel, comprising: aggregating the data packets into aggregate data packets for transmission via the communication tunnel, the data packets aggregated based on one or more aggregation parameters; monitoring one or more tunnel parameters indicative of transmission of the aggregate data packets via the communication tunnel; and adjusting the aggregation parameters based on the monitored tunnel parameters.

In accordance with embodiments of the present invention, there is provided an apparatus for handling data packets transmitted via a communication tunnel, comprising: a packet aggregator configured to aggregate the data packets into aggregate data packets for transmission via the communication tunnel, the data packets aggregated based on one or more aggregation parameters; a tunnel monitor configured to monitor one or more tunnel parameters indicative of transmission of the aggregate data packets via the communication tunnel; and a controller configured to receive feedback data from the tunnel monitor indicative of the monitored one or more tunnel parameters; adjust the aggregation parameters based on the feedback data; and transmit the adjusted aggregation parameters to the packet aggregator.

In accordance with embodiments of the present invention, there is provided a method and apparatus for handling data packets for transmission from a packet aggregation point. Operations of the method and apparatus include: aggregating the data packets into aggregate data packets at the aggregation point for transmission therefrom, the data packets aggregated based on one or more aggregation parameters; monitoring one or more traffic parameters indicative of handling of the aggregate data packets at devices in receipt of the aggregate data packets; and adjusting the aggregation parameters based on the monitored traffic parameters.

BRIEF DESCRIPTION OF THE FIGURES

Further features and advantages of the present invention will become apparent from the following detailed description, taken in combination with the appended drawings, in which:

FIGS. 8a and 8b illustrate simulation results in accordance with other embodiments of the present invention.

It will be noted that throughout the appended drawings, like features are identified by like reference numerals.

DETAILED DESCRIPTION

Embodiments of the present invention provide a method and apparatus for handling data packets transmitted through a communication tunnel. The tunnel can represent a logical connection between a pair of points in a host communication network, can serve a specified set of traffic flows, and can be implemented through a single communication path or via a number of communication paths. Packets can be aggregated prior to transmission through the tunnel, and the manner in which the packets are aggregated can be adjusted according to certain aggregation parameters. The packet aggregation parameters in turn can be adapted in response to observed tunnel performance, and can thus be used to tune tunnel performance. One or more measurements (tunnel parameters) indicative of tunnel performance can be determined, and these measurements can be used to adjust the packet aggregation parameters, thereby adjusting the manner in which packets are aggregated for transmission through the tunnel.

Some embodiments of the present invention may be used to provide adaptive packet aggregation for non-tunneled traffic. For example, adaptive packet aggregation based on monitored traffic parameters may be performed for aggregating packets at a router which transmits aggregate packets that are not necessarily used to tunnel constituent packets from a tunnel entrance to a tunnel exit. The router which aggregates and transmits the aggregate packets is referred to as the aggregation point. In some embodiments, the monitored traffic parameters characterize traffic downstream of the packet aggregation point. The monitored traffic parameters may be indicative of packet end-to-end delay measured from the aggregation point to a packet destination, de-aggregation point, or other designated location in the network. The monitored traffic parameters may be indicative of queue status (e.g. queue sizes and/or packet drop rates) at one or more routers through which the packets pass following traversal of the packet aggregation point.

Adaptive packet aggregation for non-tunneled traffic can proceed similarly to adaptive packet aggregation for tunneled traffic as described herein. However, rather than reference to entities such as tunnels and intra-tunnel routers, the adaptive packet aggregation is based on observed traffic parameters at devices, such as routers, in receipt of the aggregate data packets. The traffic parameters are comparable to the tunnel parameters as described herein, except that such parameters are not necessarily associated with a tunnel.

Figure 1:
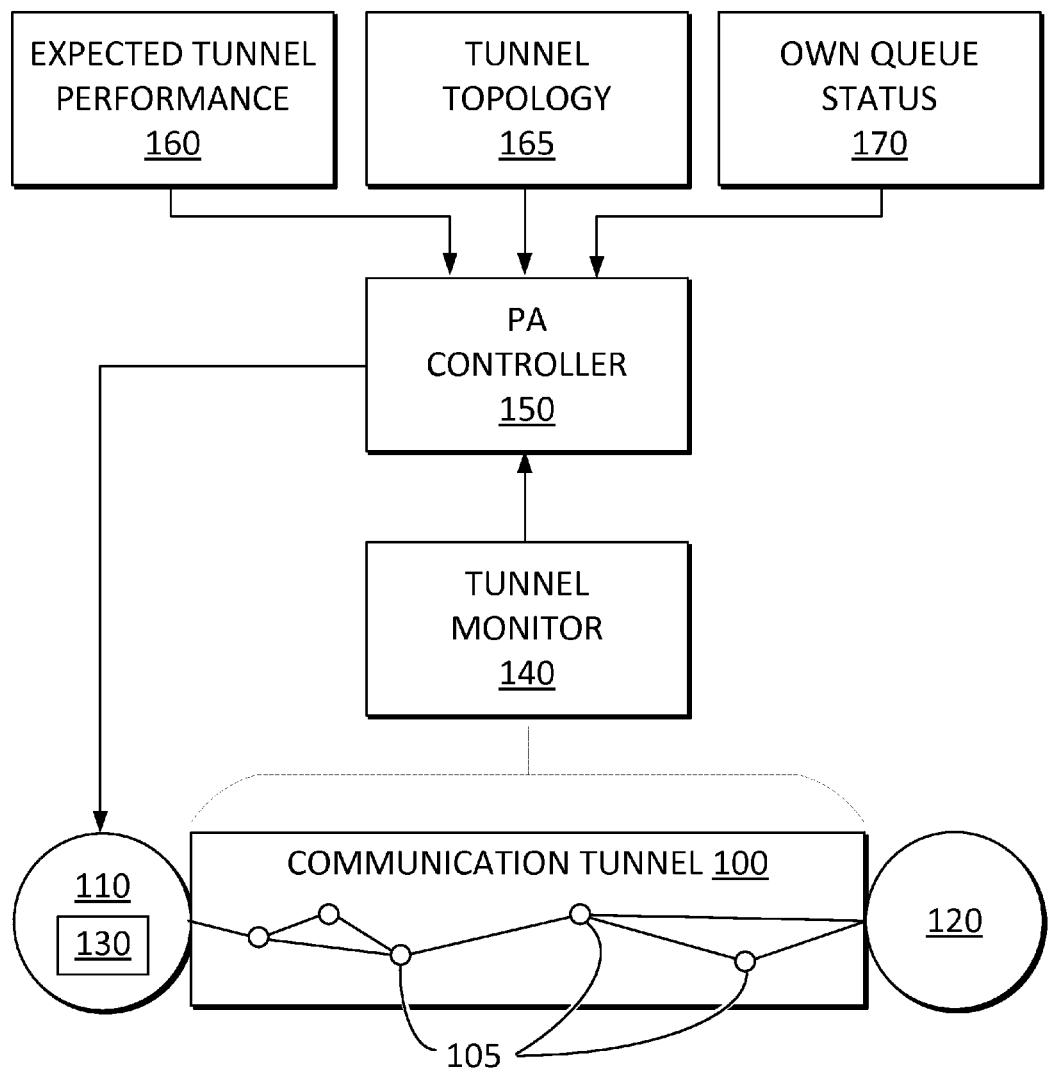
FIG. 1 illustrates an apparatus for handling data packets transmitted via a communication tunnel, in accordance with an embodiment of the present invention.

FIG. 1 illustrates an apparatus for handling data packets in accordance with an embodiment of the present invention. A communication tunnel 100 is provided for transmitting data packets from a tunnel entrance 110 to a tunnel exit 120. A packet aggregator 130 is associated with the tunnel entrance 110 and is configured, for at least some values of aggregation parameters, to aggregate packets received at the tunnel entrance prior to transmission through the tunnel. The packet aggregator 130 aggregates the data packets based on provided aggregation parameters, which are adjustable. The aggregation parameters can include an aggregation window size, which specifies for example how many packets are to be included in each aggregate packet.

In some embodiments, the aggregation parameters may include a filtering predicate or packet qualifier defined by multiple factors describing a packet or the traffic's properties. The filtering predicate indicates that only the qualifying packets are to be aggregated. The filtering predicate may indicate which types of packets to be aggregated, for example according to parameters indicated in data fields of the packet or apparent from analysis of the packet, such as QoS parameters, source or destination address or type, packet type, payload type, TTL count, packet size, encoding, or other parameter.

The communication tunnel 100 may include one or more intra-tunnel routers 105. A tunnel monitor 140 is operatively coupled to the communication tunnel 100. The tunnel monitor 140 is configured to monitor one or more tunnel parameters indicative of performance of the communication tunnel 100. For example, the tunnel monitor may receive information from the intra-tunnel routers 105 such as queue size information. As another example, the tunnel monitor may receive information from routers at the tunnel entrance 110 and tunnel exit 120, for example information indicative of their queue status and/or tunnel end-to-end delay. The tunnel monitor is also operatively coupled to a packet aggregation (PA) controller 150. The tunnel monitor forwards feedback data indicative of the monitored tunnel parameters to the PA controller. The tunnel monitor may process the tunnel parameters prior to forwarding same as feedback data. For example, the tunnel monitor may process bulk monitored data into statistics, trends, numerical indicators, or the like.

The PA controller 150 receives the feedback data, potentially along with other data such as desired tunnel performance parameters 160, tunnel topology information 165, and queue status 170 of a router located at the tunnel entrance 110. Based on the feedback data, possibly in association with the other data, the PA controller 150 determines adjusted aggregation parameters to be used by the packet aggregator 130. The adjusted aggregation parameters are then communicated to the packet aggregator 130 via a control link and used to direct packet aggregation. In some embodiments, the PA controller is co-located and/or integrated with the tunnel entrance. In some embodiments, the PA controller is co-located and/or integrated with the tunnel monitor.

The tunnel exit 120 can be configured to inspect headers of received (tunneled) packets to determine whether a received packet is an aggregate packet which is to be de-aggregated. For example, a packet may be marked for de-aggregation if the tunnel exit is the intended receiver of the packet. If so, the tunnel exit can perform de-aggregation of the packet. In some embodiments, when the tunnel exit is the entrance of a second tunnel, and a packet received by the tunnel exit is to be routed through the second tunnel, de-aggregation may be inhibited if the second tunnel is currently controlled to implement packet aggregation (for example via instruction of a second PA controller).

Figure 2:
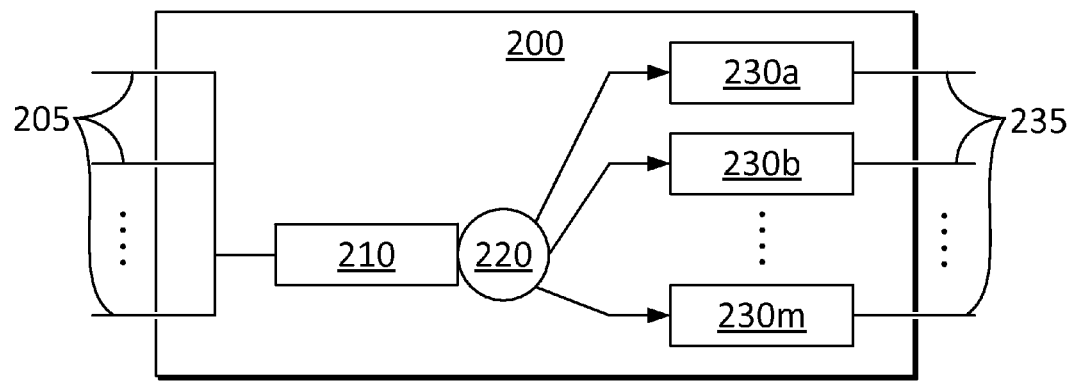
FIG. 2 illustrates a router used in accordance with embodiments of the present invention.

FIG. 2 illustrates a router 200 used in accordance with embodiments of the present invention. The illustrated router may represent a router associated with (for example located at) the tunnel entrance or a router located within the tunnel. Routers located at the tunnel entrance may perform packet aggregation, whereas routers located within the tunnel receive previously aggregated packets. The illustrated router 200 includes a processing queue 210, a processor 220, and a plurality of m transmission queues 230a, 230b, . . . 230m.

The processing queue 210 receives packets from one or more inputs 205 such as network interfaces operatively coupled to one or more incoming communication links. The processing queue then provides received packets to the processor 220.

The processor 220 receives packets from the processing queue 210 and inspects these packets, for example including reading the packet header. The processor 220 makes a determination of which transmission queue 230a, 230b, . . . 230m the packet is to be forwarded to. This determination corresponds to a routing (switching) function of the router, as would be readily understood by a worker skilled in the art.

In certain instances, the processor 220 may further perform packet aggregation, in which multiple packets from the processing queue 210 are aggregated into an aggregate packet. In this capacity, the processor 220 may function as at least a portion of the packet aggregator as described elsewhere herein. In other embodiments, the packet aggregator can be provided separately.

In some embodiments, the processor performs packet aggregation and routing functions concurrently, for example via multi-threading. In some embodiments, separate processors may be provided for performing the packet aggregation and routing functions in parallel. The packet aggregation function may retrieve packets from the processing queue concurrently with operation of the routing function, or the packet aggregation function may wait for the routing function to de-queue packets, and operate on these de-queued packets. The packet aggregation function may utilize a particular processor to perform the de-queuing and this particular processor may implement different packet de-queuing techniques for QoS purposes. In some embodiments, after performing packet aggregation, the packet aggregation function returns the aggregate packets into the processing queue for passing to the routing function. In other embodiments, the packet aggregation function passes the aggregate packets directly to the routing function.

The transmission queues 230a, 230b, . . . 230m hold packets pending outgoing transmission via outputs 235, such as network interfaces operatively coupled to one or more outgoing communication links. Each transmission queue is typically associated with one corresponding outgoing communication link.

Figure 3:
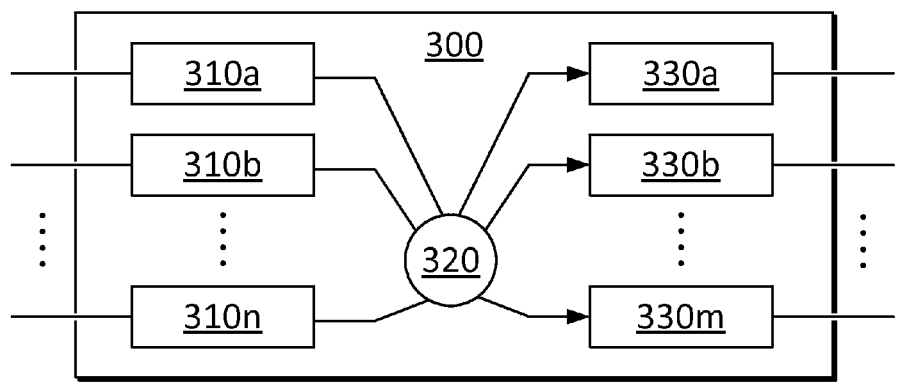
FIG. 3 illustrates another router used in accordance with embodiments of the present invention.

FIG. 3 illustrates another router 300 used in accordance with embodiments of the present invention, such as a router located at the tunnel entrance or a router located within the tunnel. In contrast with the router 200 of FIG. 2, the router 300 includes n processing queues 310a, 310b, . . . 310n. The processor 320 receives packets from the n processing queues. The processor implements a routing function, which may direct the received packets to an appropriate transmission queue, and potentially aggregate packets. As such, for each packet, the routing function selects one of the transmission queues and forwards the packet to a selected transmission queue out of m transmission queues 330a, 330b, . . . 330m. Other aspects of the router 300 may be substantially as described with respect to FIG. 2. Packet aggregation may combine multiple packets from one or a plurality of the n processing queues.

The packets in the processing queues 310a, 310b, . . . 310n are awaiting header processing, for example including switching in accordance with the routing function. The queue size in the processing queues is subject to packet arrival rates and header processing rates. The packets in the transmission queues await transmission, and queue size thereof is subject to packet arrival rate (which is limited by the header processing rate), packet size and outgoing link capacity.

Figure 4:
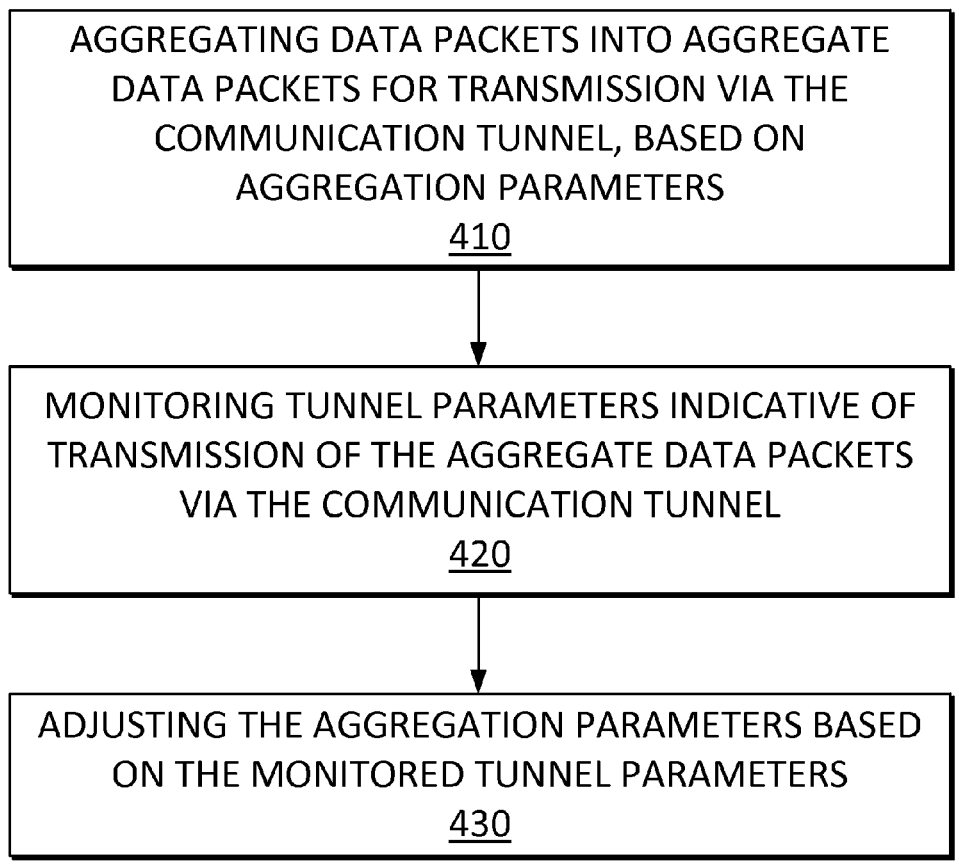
FIG. 4 illustrates a method for handling data packets transmitted via a communication tunnel, in accordance with an embodiment of the present invention.

FIG. 4 illustrates a method for handling data packets transmitted via a communication tunnel. The method includes aggregating 410 the data packets into aggregate data packets for transmission via the communication tunnel, the data packets aggregated based on one or more aggregation parameters. The method further includes monitoring 420 one or more tunnel parameters indicative of transmission of the aggregate data packets via the communication tunnel. The method further includes adjusting 430 the aggregation parameters based on the monitored tunnel parameters. The adjusted aggregation parameters may result in a different type or level of packet aggregation, or a cessation of packet aggregation.

In some embodiments, packet aggregation can be initially disabled, and the method can further include enabling packet aggregation based on tunnel parameters. In this case, the method may include monitoring one or more tunnel parameters indicative of transmission of (potentially non-aggregated) data packets via the communication tunnel. The method further includes adjusting the aggregation parameters based on the monitored tunnel parameters. The adjusted aggregation parameters may result in aggregating of further data packets into aggregate data packets for transmission via the communication tunnel, the data packets aggregated based on the one or more aggregation parameters. The aggregation parameters can from time to time take on values which cause the packet aggregator to refrain from aggregating packets, while at other times the aggregation parameters can take on values which cause the packet aggregator to aggregate packets in accordance with a certain aggregation window size.

Tunnel Parameters

The tunnel parameters can relate to one or more observable network characteristics that can be affected directly or indirectly by adjusting the aggregation parameters. The observable network characteristics can be Quality of Service (QoS) characteristics. Examples of tunnel parameters include end-to-end packet delay of the tunnel, data throughput of the tunnel, and status of queues belonging to routers associated with the tunnel.

In various embodiments, the tunnel parameters may include status of queues belonging to routers located within the tunnel. Such intra-tunnel routers directly or indirectly receive packets from the tunnel entrance and forward these packets toward the tunnel exit. The tunnel parameters may thus reflect not only the queue status at a single router, but the queue statuses at multiple routers. In some embodiments, the tunnel parameters may include a combination of queue status at intra-tunnel routers and queue status at a router located at the tunnel entrance or exits. In some embodiments, the tunnel parameters may include a status of one or more queues belonging to a router located at the tunnel entrance or exits. In other embodiments, the queue status at the tunnel entrance or exit router may be considered separately.

In one embodiment, the tunnel parameters reflect the end-to-end delay or throughput of the tunnel, and the queue status of the intra-tunnel routers.

In some embodiments, the router queue status can reflect the status of multiple different queues within the router. Such queues can include one or more processing queues and one or more transmission queues. The status of both types of queues at intra-tunnel routers may be monitored and used to adjust packet aggregation parameters. In one embodiment, router queue status at a router can be described using a vector quantity or set of vector quantities. Similarly, router queue status at a combination of routers can be described using a vector quantity or set of vector quantities.

According to embodiments, a tunnel parameter can include statuses of one or more processing queues and statuses of one or more transmission queues of a router associated with the communication tunnel. The processing queues are configured to enqueue and provide data for processing. According to embodiments, the data for processing includes providing the data to a routing function or a packet aggregation function. The routing function can be configured to select one of the transmission queues and to forward data to said one of the transmission queues and the transmission queues can be configured to enqueue data for transmission from the router. In addition, the packet aggregation function can be configured to perform said aggregating of the data packets into aggregate data packets.

In some embodiments, a queue status can be independent of packet type. For example the queue status can represent a total number of packets in the queue, a frequency of queue overflow and/or underflow events, packet drop rate or other measurement of packet drop events, or a rate of change of the queue size, for example indicative of queue buildup. In other embodiments, a queue status can pertain to one or more particular types of traffic handled by the queue. Traffic type may correspond to data content of corresponding packets, QoS requirements of the traffic, or the like. For example, the queue status can represent the total absolute or relative number of packets of the particular types in the queue. Queue status observations can vary in precision. For example, a queue status observation can indicate that the queue size belongs to a certain predetermined range or bin.

In some embodiments, queue status can be reported periodically. In other embodiments, queue status can be reported in response to an event or request. For example, queue status can be reported when the queue size crosses a predetermined threshold.

In some embodiments, queue status can be reported as a signal, such as an alarm signal, which is indicative of queue buildup or queue overflow, or some other notable event. Such signals can be reported as the underlying events occur.

The tunnel parameters can be represented as an observed value, a sequence of observed values, one or more statistics or parameters based on the observed values, or the like. The sequence of observed values can be provided as filtered or unfiltered time series data. The statistics based on observed values can include a mean and variance of the observations. The parameters can be parameters of a model, for example describing traffic flow through the tunnel.

In some embodiments, the tunnel can be represented by a model, such as a linear dynamic system model. The tunnel parameters can represent the estimated or predicted state of the dynamic system model, and the sequence of observed values can correspond to observations indicative of the system state, which can be used to update the tunnel model.

Tunnel parameters can be obtained in various ways, as would be readily understood by a worker skilled in the art. For example, a monitoring function in a router can periodically observe queue status and transmit a time-stamped queue status report message on a control channel. Tunnel end-to-end delay can be observed by injecting test packets into the tunnel and configuring routers at tunnel ends to report upon packet traversal. Tunnel throughput can be observed by monitoring a combination of traffic volume provided to the tunnel, tunnel queue status, and traffic volume provided by the tunnel.

In some embodiments, packet aggregation can further be based in part on a network topology of the tunnel. The topology can relate to a physical path through the network through which tunneled packets are transmitted from tunnel entrance to tunnel exit. Information indicative of the network topology of the tunnel can be provided to the tunnel entrance by an entity such as a network controller.

In some embodiments, topological information includes communication paths, including particular routers and links, used for transporting the tunneled traffic. The topological information may be used to identify bottleneck routers belonging to the tunnel. For example, a bottleneck router may be a router shared by multiple tunnel paths. In some embodiments, when there are no clear or critical bottleneck routers along the tunnel path, the tunnel parameters may correspond to an average queue status of routers corresponding to the tunnel. In some embodiments, when a clear or critical bottleneck router exists in the tunnel, the tunnel parameter may correspond to the worst (e.g. longest queue) of the average queue status and the bottleneck router queue status. As such, the tunnel parameters may be based on the tunnel topological information.

In some embodiments, packet aggregation can further be based in part on an a pre-specified desired performance of the tunnel. Information indicative of the desired performance can be provided to the tunnel entrance by an entity such as a network controller. This information can potentially include one or more of: a desired tunnel throughput, a desired tunnel end-to-end delay, desired queue size statistics for tunnel routers, desired packet drop rates, etc. Adaptive packet aggregation can then comprise adjusting packet aggregation rules in order to reduce a difference between observed and desired tunnel performance. The desired tunnel performance can represent a setpoint and the difference between observed and desired tunnel performance can represent an error value to be minimized. Various approaches such as but not limited to PID control can be used to minimize the error value.

Adaptive Aggregation

Embodiments of the present invention comprise adjusting, based on monitored tunnel parameters, aggregation parameters which direct the aggregation of data packets into aggregate data packets for transmission via the communication tunnel.

In various embodiments, the aggregation parameters include one or more aggregation window sizes. An aggregation window size may be defined in terms of a size of the aggregate data packets, for example measured in bits. An aggregation window size may be defined in terms of a number of the data packets to be included in each of the aggregate data packets. An aggregation window size may be defined in terms of an inter-transmission time of the aggregate data packets. The inter-transmission time may reflect the length of time between initial creation of the aggregate data packet and transmission of the aggregate data packet. The inter-transmission time may additionally or alternatively reflect the length of time between transmissions of successive aggregate data packets. In various embodiments, an aggregation window size in time specifies the maximum waiting time, for example measured from initial creation of an aggregate packet, before wrapping up and transmitting the aggregate packet.

In various embodiments, packet aggregation proceeds generally as follows. A set of multiple original packets presented to the tunnel entrance (tunneled packets) are selected and embedded into a common aggregate packet. An indicator is set in the aggregate packet header to flag that the packet is an aggregate packet, in order to trigger subsequent de-aggregation, for example following tunnel traversal.

Selection of the original packets is based on the current aggregation parameters, parameters, for example specifying a current aggregation window size. For example, when an aggregation window size includes a size or number of data packets in the aggregate data packet, incoming (e.g. queued) data packets are embedded into the aggregate data packet until this size or number limit is reached.

In various embodiments, the aggregation parameters can indicate whether packet aggregation is currently enabled or disabled. Disabling packet aggregation can correspond to setting the aggregation window size to unity.

When an aggregation window size includes a time limitation, incoming data packets are embedded into the aggregate data packet until the time limitation is reached. For example, if the time limitation reflects the length of time between initial creation of the aggregate data packet and transmission of the aggregate data packet, then incoming data packets can cease to be embedded into the aggregate data packet at a designated time, which is selected so that the aggregate data packet can be finalized and transmitted without violating the time limitation.

In one embodiment, when an aggregation window size includes multiple parameters, such as size, number and time parameters, the aggregate packet can be prepared in a manner that respects all of these parameters. For example, creation of the aggregate data packet can cease when the first of: a time limit is reached, a size limit is reached, and a packet number limit is reached.

In some embodiments, packet aggregation decisions can be performed based on a computation such as an optimization or online analysis. The computation produces the packet aggregation parameters based at least in part on the tunnel parameters. For example, the tunnel parameters may be provided as a mathematical or logical function of the packet aggregation parameters.

In one embodiment, an allowed maximum queue size at intra-tunnel routers is fed back to the packet aggregation controller, and packet aggregation parameters are configured to respect the reported allowed maximum queue size to avoid or mitigate queue overflow. Given packet arrival rates, an optimal queue size can be determined, for example, in accordance with the analysis presented in D. Shah, N. S. Walton and Y. Zhong, "Optimal queue-size scaling in switched networks," Annals of Applied Probability, Vol. 24, No. 6, pp. 2207-2245, 2014. Through reverse engineering and analysis, appropriate packet arrival rates can be determined for individual intra-tunnel routes with respect to their queue size, and packet aggregation parameters can be adjusted for example to ensure a packet arrival rate not larger than a respective desired arrival rate at each intra-tunnel router.

In some embodiments, packet aggregation decisions can be performed based on a table lookup approach. A lookup table is maintained in computer memory mapping a plurality of ranges of tunnel parameters to a corresponding plurality of packet aggregation parameters. The current tunnel parameters are specified in a table lookup operation, and appropriate packet aggregation parameters, to which the current tunnel parameters map, is returned by the table lookup operation.

In some embodiments, packet aggregation decisions can be performed using a rule-based approach. For example, a set of rules may be implemented based on the monitored tunnel parameters, the rules describing changes to be made to the packet aggregation parameters based on the current tunnel parameters. For example, when the tunnel parameters are in a first range, a rule may be implemented to cause the packet aggregation parameters to be in a corresponding first state. When the tunnel parameters are in a second, different range, a rule may be implemented to cause the packet aggregation parameters to be in a corresponding second state.

In various embodiments, other information, such as tunnel entrance queue statistics or tunnel topological information, may influence the packet aggregation decisions, and may be treated as part of the tunnel parameters for the purpose of making packet aggregation decisions as described above. For example, as mentioned above, the tunnel topological information can include routers and communication paths between routers, and may be used to identify bottleneck routers belonging to the tunnel. The identification of bottleneck routers may influence the tunnel parameters which in turn influences the packet aggregation parameters.

Selection of the original packets for aggregation can be further based on other characteristics. For example packets of a common type, or packets having similar QoS requirements, can be selected for aggregation.

Figure 5:
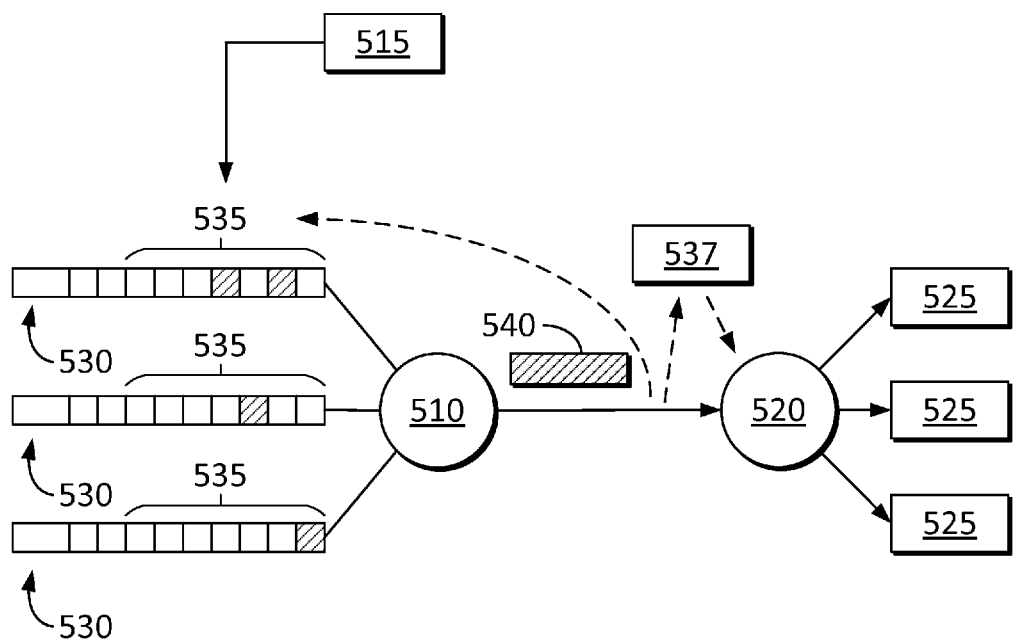
FIG. 5 illustrates a router configured to perform adaptive packet aggregation in accordance with an embodiment of the present invention.

FIG. 5 illustrates aspects of a router configured to perform adaptive packet aggregation in accordance with an embodiment of the present invention. The router includes a packet aggregator 510 and a routing function 520. The packet aggregator 510 selects packets from processing queues 530 and aggregates the selected packets into an aggregate packet 540. The number of selected packets is based on an aggregation window size 535 parameter which is adjusted by a PA controller 515. The aggregate packet is handled by the routing function 520 in order to forward it to an appropriate transmission queue 525. Some packets from the processing queues 530 may bypass the packet aggregator 510. In some embodiments, rather than providing the aggregate packet 540 directly to the routing function 520, the packet aggregator can return the aggregate packet to a processing queue or to a further queue 537.

In various embodiments, packet aggregation can be performed prior to routing, concurrently with routing, or subsequent to routing.

It is noted that, in various embodiments, packet aggregation can decrease the granularity of traffic engineering efforts, and may potentially reduce traffic engineering-enabled network performance. As such, packet aggregation can have positive impact under certain conditions but negative impact under certain other conditions.

In more detail and in some embodiments, as traffic splitting does not happen at the packet level, in the presence of large-size, aggregate packets, traffic splitting tends to lose its granularity. Therefore packet aggregation can potentially lead to a decrease in performance by reducing the granularity of traffic splitting. Traffic splitting is defined by the traffic engineering controller, and indicates how to divide traffic among multiple paths (in terms of rates) such that link capacity constraints are respected and a network utility is maximized. The utility may be based on sum throughput and/or fairness, for example.

Additionally, in some embodiments, performance gains are observed mainly or only when one or more intra-tunnel routers are congested by tunnel traffic. Such performance gains can be identified by analyzing the per-traffic-type queue status at the intra-tunnel routers, for example by comparing the queue status against a threshold value. If packet aggregation is performed when no performance gain is observable, tunnel performance may drop as aggregation brings additional delay to the tunnel traffic.

Therefore, in some embodiments, packet aggregation is engaged only under those certain conditions for which a positive impact is expected. As noted above, packet aggregation can be disengaged for example by causing the PA controller to set the aggregation window size to unity, or otherwise by setting the aggregation parameters to a certain corresponding value.

For example, in some embodiments, packet aggregation is engaged or increased when a bottleneck to tunnel operation is located at the packet processing function of one or more tunnel routers, such as the tunnel entrance router. Packet aggregation may similarly be disengaged or decreased if doing so is expected not to be detrimental to tunnel performance due to the resultant introduction of such packet processing bottlenecks. It is noted that packet aggregation can decrease packet processing requirements since several packets are merged into a single packet, hence only one header is processed rather than several headers.

In view of the above, and in some embodiments, adjusting the aggregation parameters includes reducing aggregating of the data packets into aggregate data packets when the queue size of certain processing queues lies below a first predetermined threshold and the queue size of certain transmission queues lies above a second predetermined threshold. Conversely, adjusting the aggregation parameters includes increasing aggregating of the data packets into aggregate data packets when the queue size of the processing queues lies above the first threshold and the queue size of the transmission queues lies below the second threshold. Reducing or increasing the aggregating of data packets may include reducing or increasing the aggregation window size, so that generally fewer or more data packets are aggregated together, respectively. The amount of reduction or increase can be a fixed value, or a function of the queue sizes. For example, the amount of reduction or increase can be proportional to the mean difference between queue sizes and thresholds.

Furthermore, in some embodiments, adjusting the aggregation parameters includes reducing aggregating of the data packets into aggregate data packets when a queue size of aggregate data packets awaiting router processing is below a first threshold, and increasing aggregating of the data packets into aggregate data packets when the queue size of aggregate data packets awaiting router processing is above the first threshold. As such, the aggregation parameters can be dependent on processing queue size, but independent of a direct measure of transmission queue size.

As another example, in some embodiments, packet aggregation is engaged or increased in proportion to tunnel length. For example, packet aggregation can be engaged or increased when the tunnel length exceeds a threshold value. In view of this, adjusting the aggregation parameters can include reducing aggregating of the data packets into aggregate data packets when a measure of tunnel length is below a first threshold, and increasing aggregating of the data packets into aggregate data packets when the measure of tunnel length is above the first threshold. The measure of tunnel length can be determined from tunnel topology information, for example, and can include factors such as number of hops. Conversely, packet aggregation can be disengaged or decreased when the tunnel length falls below the threshold value.

In some embodiments, when the tunnel length exceeds the threshold value, packet aggregation is performed, as it benefits more network elements (routers) compared with a short tunnel involving only a few routers, and improves the network overall performance, including the performance of background traffic.

In some embodiments, adjusting the aggregation parameters based on the tunnel parameters includes adjusting a type of the aggregation window size. The type of aggregation window size may correspond to: sizing of the aggregate data packets; numbering of data packets included in the aggregate data packets; and inter-transmission timing of the aggregate data packets. The type or types of aggregation window size being implemented corresponds to which measures of aggregation window size, for example data-length-based or time-based measures, are implemented.

For example, in one embodiment, initially only a time-based aggregation window size is used. However, when the tunnel parameters reach a predetermined condition, a number-of-packet-based aggregation window size may be used in addition to or in place of the time-based aggregation window size. Multiple aggregation window size definitions may be used concurrently, for example with the aggregation windows being constructed so as to respect each of the definitions.

According to embodiments of the present invention, adjusting the aggregation parameters includes one or more of: reducing aggregating of the data packets into aggregate data packets when a measure of queue size of one or more processing queues of routers associated with the communication tunnel is below a first threshold and a measure of queue size of one or more transmission queues of routers associated with the communication tunnel is above a second threshold, and increasing aggregating of the data packets into aggregate data packets when the measure of queue size of the one or more processing queues is above the first threshold and the measure of queue size of the one or more transmission queues is below the second threshold; reducing aggregating of the data packets into aggregate data packets when a measure of tunnel length is below a first threshold, and increasing aggregating of the data packets into aggregate data packets when the measure of tunnel length is above the first threshold; and reducing aggregating of the data packets into aggregate data packets when a measure of queue size of aggregate data packets awaiting router processing is below a first threshold, and increasing aggregating of the data packets into aggregate data packets when the measure of queue size of aggregate data packets awaiting router processing is above the first threshold.

Performance Evaluation

Figure 6:
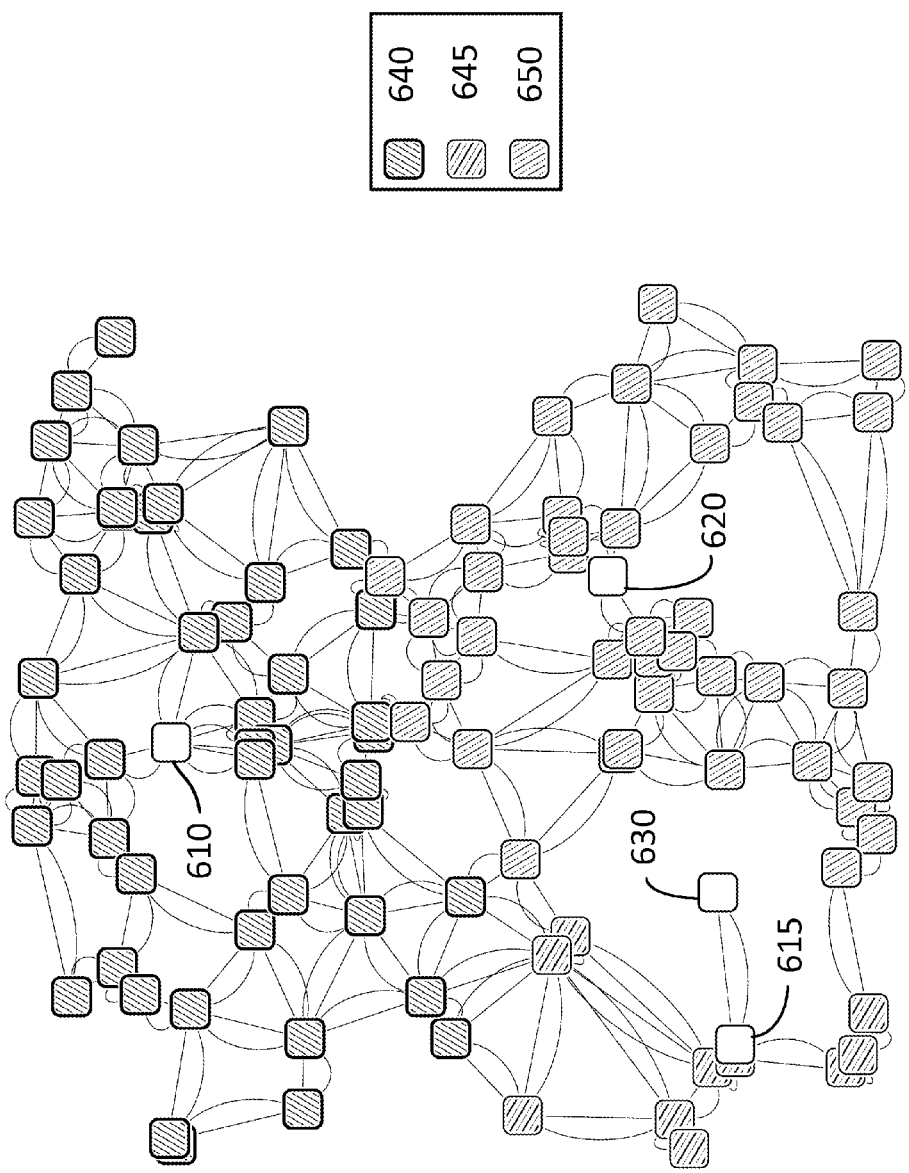
FIG. 6 illustrates a simulated network topology used for performance evaluation of embodiments of the present invention.

FIG. 6 illustrates a simulated network topology used for performance evaluation of embodiments of the present invention. The network topology corresponds to a mesh network having 101 nodes and three uplink tunnels. Routers corresponding to the network nodes introduce a 10 µs switching delay per packet. 32 CPUs per router are provided for parallel processing. Simulated uplink (tunneled traffic) corresponds to constant bit rate (CBR) traffic having a packet size of 1,000 bits and a configurable number of packets per second. Simulated background traffic corresponds to uplink/downlink video traffic, of 10,000 packets per second and a configurable packet size. Traffic engineering is applied to both simulated traffic types.

FIG. 6 illustrates three tunnel entrance nodes 610, 615, 620 corresponding to three different tunnels, and a tunnel exit node 630 common to each of the three tunnels. The tunnel exit node is a common destination for all traffic sources. All nodes except the tunnel exit node 630 are configured as traffic sources. FIG. 6 further illustrates three groupings of traffic sources 640, 645, 650 using the three tunnel entrance nodes 610, 615, 620, respectively.

Figure 7A:
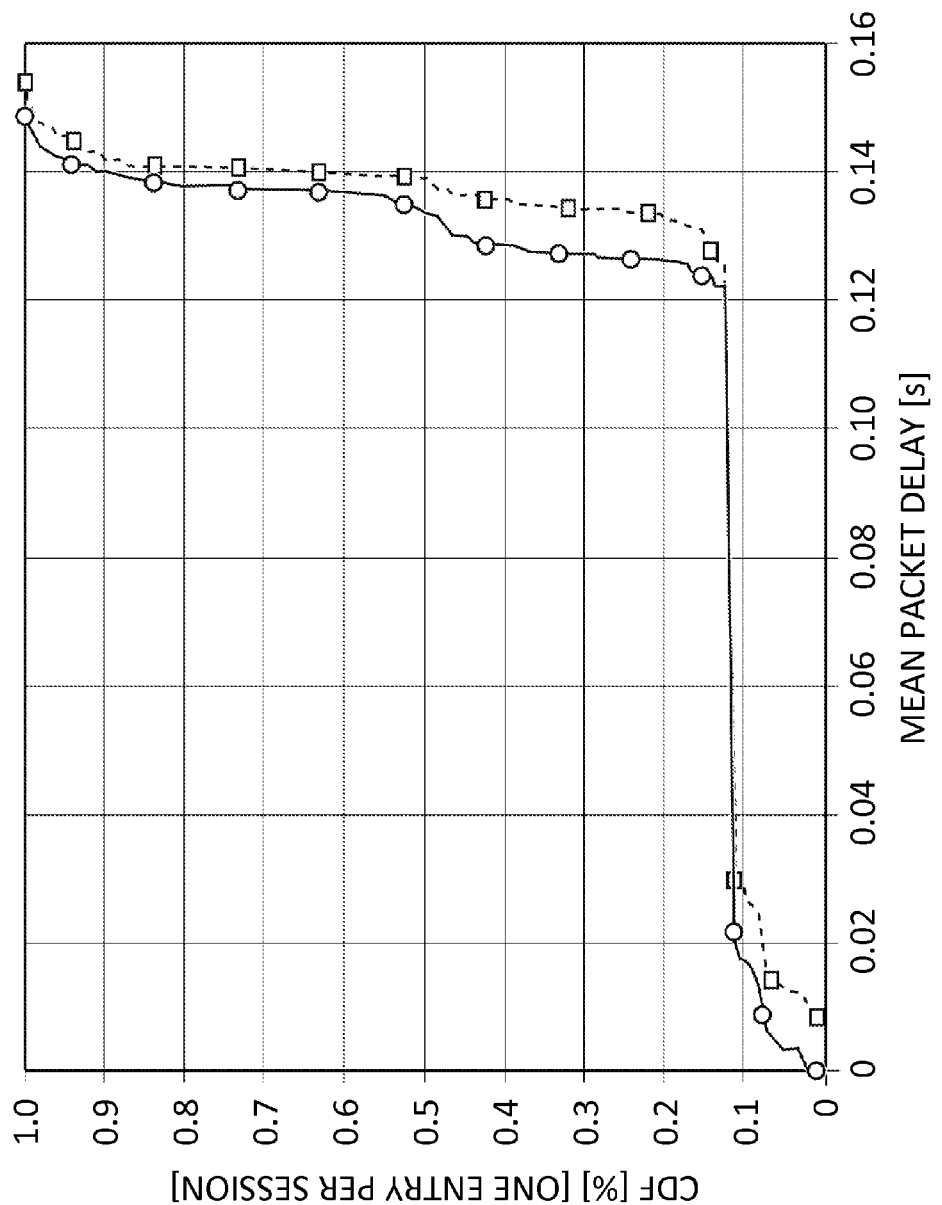
FIGS. 7a and 7b illustrate simulation results in accordance with some embodiments of the present invention.
Figure 7B:
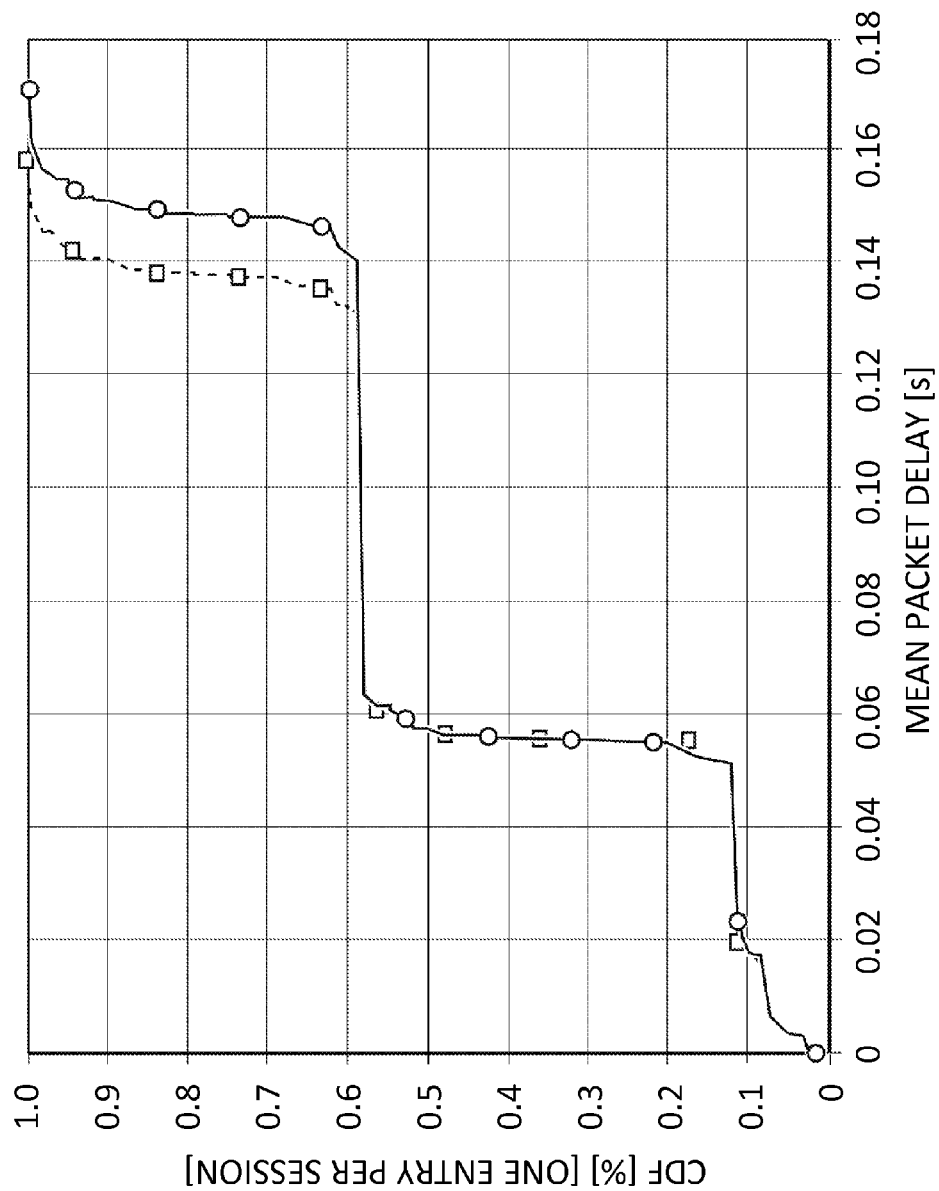

FIGS. 7a and 7b graphically illustrate a simulated underloaded scenario with dominating background traffic. The background traffic rate is 25 mbps with a packet size of 100,000 bits. The tunneled traffic (packet size 1,000 bits) is provided at a constant bit rate of 0.1 mbps in FIGS. 7a and 2 mbps in FIG. 7b. Traces 710 and 730 correspond to a simulation with packet aggregation window size of unity (no packet aggregation). Traces 720 and 740 correspond to a simulation with packet aggregation window size of 20 packets. The graphs illustrate the cumulative distribution function (CDF) of mean packet delays. Mean packet delay in turn can be interpreted as corresponding to tunnel length. As illustrated in FIG. 7a, for the lower tunneled traffic rate, packet aggregation results in a higher mean packet delay and hence a performance degradation. As illustrated in FIG. 7b, for the higher tunneled traffic rate, packet aggregation results in a lower mean packet delay particularly at the higher range of delays, and hence a performance improvement for longer tunnels. As such, configuring packet aggregation based on tunnel topology may be advantageous in various embodiments.

Figure 8B:
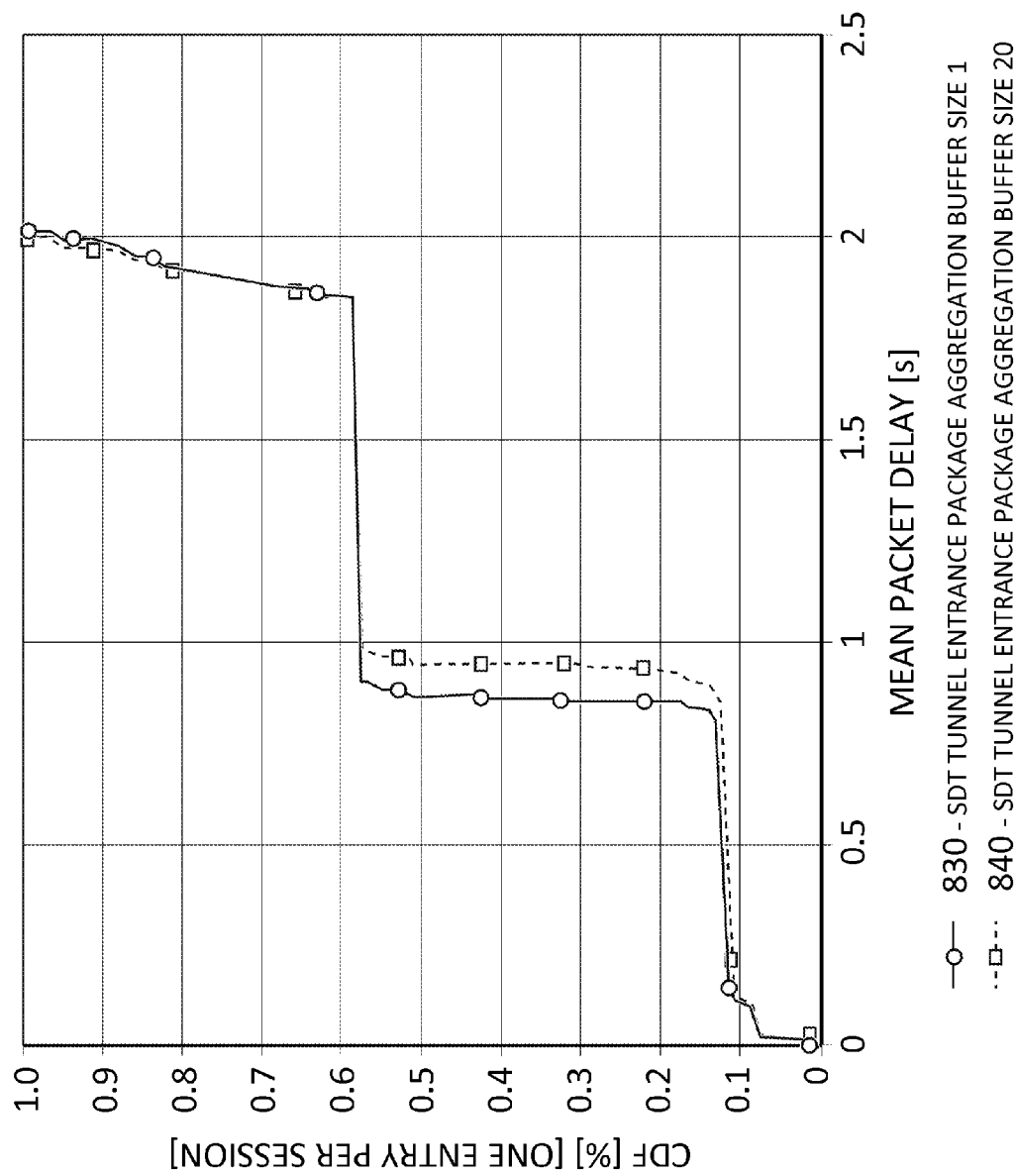

FIGS. 8a and 8b graphically illustrate a simulated overloaded scenario with dominating background traffic. The background traffic rate is 50 mbps with a varying packet size. The tunneled traffic (packet size 1,000 bits) is provided at a constant bit rate of 0.1 mbps in FIGS. 8a and 2 mbps in FIG. 8b. Traces 810 and 830 correspond to a simulation with packet aggregation window size of unity (no packet aggregation). Traces 820 and 840 correspond to a simulation with packet aggregation window size of 20 packets. The graphs illustrate the cumulative distribution function (CDF) of mean packet delays. As illustrated in FIG. 8a, for the lower tunneled traffic rate, packet aggregation results in a marginally lower mean packet delay and hence a marginal performance improvement. As illustrated in FIG. 8b, for the higher tunneled traffic rate, packet aggregation results in a higher mean packet delay particularly at the middle range of delays, and hence a performance degradation. As such, configuring packet aggregation based on per-traffic type queue status of intra-tunnel routers may be advantageous in various embodiments.

Apparatus Implementation

In various embodiments of the present invention, components such as the packet aggregator, tunnel monitor and packet aggregation controller are provided as real or virtual components within or operatively coupled to the communication network. In some embodiments, some or all of the components may be integrated together. In some embodiments, functionalities of one or more of the components may be co-located or distributed through the network.

The tunnel monitor can include a processor and a network interface configured to receive telemetry information from various tunnel components. The tunnel monitor can also include a control interface configured to transmit tunnel parameter information to the PA controller. The network interface can be configured for communication via a provided network infrastructure, such as control channels of an infrastructure data network. In some embodiments, the tunnel monitor may be implemented on an item of network infrastructure equipment such as a computer server or other networked computing device. In some embodiments, the network interface can further be configured to inject test packets into the tunnel.

In some embodiments, the tunnel monitor may be configured to communicate with tunnel routers to receive information therefrom. For example, the tunnel monitor may transmit query messages to the tunnel routers via a control channel, and the tunnel routers may be configured to respond to the query messages with appropriate information. The tunnel routers may include agents, APIs, or the like, configured to respond to the query messages appropriately. Alternatively, the tunnel routers may transmit the information to the tunnel monitor automatically, for example according to a schedule or in response to predetermined events. In some embodiments, functionality of the tunnel routers which gathers and transmits data to the tunnel monitor may be considered a part of the tunnel monitor.

The packet aggregation (PA) controller also includes a processor and a control interface. The PA controller can also include a memory containing instructions for execution by the processor, and/or electronic memory for storing data. The control interface is configured to receive tunnel parameters from the tunnel monitor, and to provide aggregation parameters to the packet aggregator.

When the PA controller is co-located with the tunnel monitor or packet aggregator within a common device, the control interfaces of the PA controller and the tunnel monitor can be configured to pass data via an internal data bus of the common device. When the PA controller is located remotely from the tunnel monitor or packet aggregator, the control interface may further include a network interface, and the control interfaces of the PA controller and the tunnel monitor may include the respective network interfaces, with tunnel parameters communicated via the network interfaces.

The processor of the PA controller is configured to determine the aggregation parameters based on the tunnel parameters, as well as other provided information such as desired tunnel performance, tunnel topology, and tunnel entrance queue status. A memory operatively coupled to the processor may store a history of information for use in computing the aggregation parameters in a predetermined manner. The processor may utilize various techniques, such as functional relationships, lookup tables, if-then statements, filtering, and averaging, to determine the aggregation parameters.

In some embodiments, the PA controller is implemented on an item of network infrastructure equipment such as a computer server or other networked computing device. In some embodiments, the packet aggregation controller is implemented on or co-located with a router situated at the tunnel entrance.

The packet aggregator also includes a processor and a control interface. The control interface is configured to receive the aggregation parameters from the PA controller, while the processor is performed to implement packet aggregation based on the aggregation parameters. Once the aggregation parameters are provided, operation of a packet aggregator, for example implemented at a router or in a stand-alone network device, can proceed as would be readily understood by a worker skilled in the art.

In various embodiments, in place of or in addition to a processor executing program instructions stored in memory, other hardware may be implemented, such as microcontroller hardware with appropriate firmware, FPGAs, ASICs, or the like.

In some embodiments, components such as the tunnel monitor or PA controller may include a microprocessor executing program instructions stored in memory. In other embodiments, components may include dedicated hardware, firmware, application-specific circuitry, microcontroller, or the like.

It will be readily understood that, throughout the preceding discussion, the above-described network functionalities and operations may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

In some embodiments structural components of the invention can be configured with sufficient functionality to enable instantiation of their respective functionality on an as-needed basis according to current processing requirements. These may, for example, be realized as virtual network functions (VNFs) within a Network Function Virtualization (NFV) framework. For example, a VNF corresponds to a function enabling operation of a communication network. For example a VNF can provide the functions of a router, switch, gateway, firewall, load balancer, server, mobility management entity, and the like. The function is virtualized in the sense that it may utilize a set of virtual resources, such as computing, storage and networking resources, rather than utilizing dedicated hardware resources. As such, VNF may be instantiated on an as-needed basis using available virtual resources. NFV and virtual network functions architecture is described in ETSI GS NFV-SWA 001, for example.

In some embodiments the structural components of the invention may comprise software defined networking (SDN) components, or programs deployed on the same or differing device platforms of the communication network. SDN is an architectural framework for creating intelligent programmable networks, where the control planes and the data planes are decoupled, network intelligence and state are logically centralized, and the underlying network infrastructure is abstracted from the application. In embodiments of the present invention, the control plane may use customer information and provide information to form a network logical topology, for example as created via software defined topology (SDT). The SDT can be combined with the SDN and software defined protocol (SDP) to create a customized virtual network (VN). A VN is a collection of resources virtualized for a particular service. Customers include users of services via a UE, terminal, or other customer device. Providers include service providers, VN operators, and other providers of services over the wireless network.

As a separate matter, SDN allows for the management of network services through abstraction of lower-level functionality. Control functions may be separated from forwarding functions for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for aggregating data packets, the method comprising:
    sending, by a controller, one or more aggregation parameters, the aggregation parameters for aggregating the data packets into aggregate data packets for transmission via a communication tunnel;
    receiving, by the controller, one or more tunnel parameters indicative of transmission of the aggregate data packets via the communication tunnel; and
    determining, by the controller, adjusted aggregation parameters based on the one or more tunnel parameters, wherein upon detecting a measure of queue size of one or more processing queues is below a first threshold and detecting a measure of queue size of one or more transmission queues is above a second threshold, reducing aggregating of the data packets into aggregate data packets and upon detecting a measure of queue size of the one or more processing queues is above the first threshold and detecting a measure of queue size of the one or more transmission queues is below the second threshold, increasing aggregating of the data packets into aggregate data packets.

2. The method of claim 1, wherein the one or more tunnel parameters include one or more of: end-to-end packet delay of the communication tunnel; throughput of the communication tunnel; and status of one or more queues belonging to routers associated with the communication tunnel.

3. The method of claim 1, wherein the aggregation parameters are adjusted further based on a network topology of the tunnel.

4. The method of claim 1, wherein adjusting the aggregation parameters is based on a comparison of one or more desired tunnel performance metrics with one or more observed tunnel performance metrics associated with the monitored tunnel parameters.

5. The method of claim 1, wherein the aggregation parameters include one or more aggregation window sizes or a filtering predicate or a packet qualifier indicative of which of the data packets are candidates for aggregating into the aggregate data packets.

6. The method of claim 1, wherein the one or more tunnel parameters include statuses of one or more transmission queues of a router associated with the communication tunnel, the processing queues configured to enqueue and provide data for processing.

7. A method for aggregating data packets, the method comprising:
sending, by a controller, one or more aggregation parameters, the aggregation parameters for aggregating the data packets into aggregate data packets for transmission via a communication tunnel;
receiving, by the controller, one or more tunnel parameters indicative of transmission of the aggregate data packets via the communication tunnel; and
determining, by the controller, adjusted aggregation parameters based on the one or more tunnel parameters, wherein upon detecting a measure of tunnel length is below a first threshold, reducing aggregating of the data packets into aggregate data packets and upon detecting a measure of tunnel length is above the first threshold, increasing aggregating of the data packets into aggregate data packets.

8. The method of claim 7, wherein the one or more tunnel parameters include one or more of: end-to-end packet delay of the communication tunnel; throughput of the communication tunnel; and status of one or more queues belonging to routers associated with the communication tunnel.

9. The method of claim 7, wherein adjusting the aggregation parameters is based on a comparison of one or more desired tunnel performance metrics with one or more observed tunnel performance metrics associated with the monitored tunnel parameters.

10. The method of claim 7, wherein the aggregation parameters include one or more aggregation window sizes or a filtering predicate or a packet qualifier indicative of which of the data packets are candidates for aggregating into the aggregate data packets.

11. The method of claim 7, wherein the one or more tunnel parameters include statuses of one or more processing queues and statuses of one or more transmission queues of a router associated with the communication tunnel, the processing queues configured to enqueue and provide data for processing.

12. A method for aggregating data packets, the method comprising:
sending, by a controller, one or more aggregation parameters, the aggregation parameters for aggregating the data packets into aggregate data packets for transmission via a communication tunnel;
receiving, by the controller, one or more tunnel parameters indicative of transmission of the aggregate data packets via the communication tunnel; and
determining, by the controller, adjusted aggregation parameters based on the one or more tunnel parameters, wherein upon detecting a measure of queue size of aggregate data packets awaiting router processing is below a first threshold, reducing aggregating of the data packets into aggregate data packets and upon detecting a measure of queue size of aggregate data packets awaiting router processing is above the first threshold, increasing aggregating of the data packets into aggregate data packets.

13. The method of claim 12, wherein the one or more tunnel parameters include one or more of: end-to-end packet delay of the communication tunnel; throughput of the communication tunnel; and status of one or more queues belonging to routers associated with the communication tunnel.

14. The method of claim 13, wherein the status of one of the one or more queues is determined based on data of a predetermined type held by said one of the one or more queues.

15. The method of claim 13, wherein the status of one of the one or more queues corresponds to one or more of: queue size, queueing delay, packet drop rate, queue size statistics, queueing delay statistics, packet drop rate statistics, queue buildup, or queue overflow.

16. The method of claim 12, wherein the aggregation parameters are adjusted further based on a network topology of the tunnel.

17. The method of claim 12, wherein adjusting the aggregation parameters is based on a comparison of one or more desired tunnel performance metrics with one or more observed tunnel performance metrics associated with the monitored tunnel parameters.

18. The method of claim 12, wherein the aggregation parameters include one or more aggregation window sizes or a filtering predicate or a packet qualifier indicative of which of the data packets are candidates for aggregating into the aggregate data packets.

19. The method of claim 18, wherein one of the aggregation window sizes is indicative of one or more of: a size of the aggregate data packets; a number of the data packets to be included in each of the aggregate data packets; and an inter-transmission time of the aggregate data packets.

20. The method of claim 12, wherein the one or more tunnel parameters include statuses of one or more transmission queues of a router associated with the communication tunnel, the processing queues configured to enqueue and provide data for processing.

21. A controller for controlling aggregation of data packets, the controller comprising:
a processor and a memory; and
the controller configured to:
send one or more aggregation parameters, the aggregation parameters for aggregating the data packets into aggregate data packets for transmission via communication tunnel, the data packets aggregated based on one or more aggregation parameters;
receive one or more tunnel parameters indicative of transmission of the aggregate data packets via the communication tunnel; and
determine adjusted aggregation parameters based on the one or more tunnel parameters, wherein upon detecting a measure of queue size of one or more processing queues is below a first threshold and detecting a measure of queue size of one or more transmission queues is above a second threshold, reducing aggregating of the data packets into aggregate data packets and upon detecting a measure of queue size of the one or more processing queues is above the first threshold and detecting a measure of queue size of the one or more transmission queues is below the second threshold, increasing aggregating of the data packets into aggregate data packets.

22. A controller for controlling aggregation of data packets, the controller comprising:
a processor and a memory; and
the controller configured to:
send one or more aggregation parameters, the aggregation parameters for aggregating the data packets into aggregate data packets for transmission via a communication tunnel, the data packets aggregated based on one or more aggregation parameters;

receive one or more tunnel parameters indicative of transmission of the aggregate data packets via the communication tunnel; and determine adjusted aggregation parameters based on the one or more tunnel parameters, wherein upon detecting a measure of tunnel length is below a first threshold, reducing aggregating of the data packets into aggregate data packets and upon detecting a measure of tunnel length is above the first threshold, increasing aggregating of the data packets into aggregate data packets.

23. A controller for controlling aggregation of data packets, the controller comprising:

a processor and a memory; and the controller configured to:

send one or more aggregation parameters, the aggregation parameters for aggregating the data packets into aggregate data packets for transmission via a communication tunnel, the data packets aggregated based on one or more aggregation parameters;

receive one or more tunnel parameters indicative of transmission of the aggregate data packets via the communication tunnel; and determine adjusted aggregation parameters based on the one or more tunnel parameters, wherein upon detecting a measure of queue size of aggregate data packets awaiting router processing is below a first threshold, reducing aggregating of the data packets into aggregate data packets and upon detecting a measure of queue size of aggregate data packets awaiting router processing is above the first threshold, increasing aggregating of the data packets into aggregate data packets.

* * * * *